(12) United States Patent
Veres et al.

(10) Patent No.: US 9,933,055 B2
(45) Date of Patent: Apr. 3, 2018

(54) DRIVING MECHANISM

(71) Applicant: OPTOFORC MŰSZAKI FEJLESZTŐ ÉS INNOVÁCIÓS KFT., Székesfehérvár (HU)

(72) Inventors: Jozsef Veres, Szolnok (HU); Akos Sandor Tar, Recsk (HU); Gyorgy Gabor Cserey, Budapest (HU)

(73) Assignee: Jedik Innovation KFT., Budapest (HU)

( * ) Notice: Subject to any disclaimer, the term of this patent is extended or adjusted under 35 U.S.C. 154(b) by 698 days.

(21) Appl. No.: 14/370,368

(22) PCT Filed: Jan. 4, 2013

(86) PCT No.: PCT/HU2013/000003
§ 371 (c)(1),
(2) Date: Jul. 2, 2014

(87) PCT Pub. No.: WO2013/102775
PCT Pub. Date: Jul. 11, 2013

(65) Prior Publication Data
US 2015/0019019 A1    Jan. 15, 2015

(30) Foreign Application Priority Data
Jan. 5, 2012    (HU) .................................... 1200012

(51) Int. Cl.
*H02P 6/12*    (2006.01)
*F16H 19/06*    (2006.01)
(Continued)

(52) U.S. Cl.
CPC ............. *F16H 19/06* (2013.01); *G05D 17/02* (2013.01); *H02K 11/215* (2016.01); *H02P 8/14* (2013.01);
(Continued)

(58) Field of Classification Search
CPC .......... B22F 98/10; B22F 9/04; B22F 1/0003; B22F 1/0088; B22F 8/00
See application file for complete search history.

(56) References Cited

U.S. PATENT DOCUMENTS

| 4,623,828 A | 11/1986 | Schmitz |
| 2007/0040529 A1 | 2/2007 | Takebayashi et al. |

(Continued)

FOREIGN PATENT DOCUMENTS

EP    1835611    9/2007

OTHER PUBLICATIONS

European Patent Office, Notification of Transmittal of The International Search Report and The Written Opinion Of The International Searching Authority, Or The Declaration, dated Sep. 23, 2013.

*Primary Examiner* — Shawki S Ismail
*Assistant Examiner* — Zoheb Imtiaz
(74) *Attorney, Agent, or Firm* — Wood Herron & Evans LLP

(57) ABSTRACT

The invention is a driving mechanism for exerting a predetermined torque characteristic, comprising a stepper motor (12) having a motor shaft, a rotation measuring device detecting the angular position of the motor shaft (14), a motor control unit effecting the torque characteristic on the basis of the angular position of the motor shaft (14), a drive shaft (10) exerting the torque characteristic and an essentially backlash-free transmission connecting the drive shaft (10) with the motor shaft (14), and the motor control unit is a local motor control unit providing operating signals to the stepper motor (12) and being programmable in at least one parameter.

8 Claims, 13 Drawing Sheets

(51) Int. Cl.
*H02P 8/14* (2006.01)
*H02P 8/34* (2006.01)
*G05D 17/02* (2006.01)
*H02K 11/215* (2016.01)
*H02K 7/10* (2006.01)

(52) U.S. Cl.
CPC .............. *H02P 8/34* (2013.01); *H02K 7/1004* (2013.01); *H02K 2213/03* (2013.01)

(56) References Cited

U.S. PATENT DOCUMENTS

| | | | |
|---|---|---|---|
| 2007/0152514 A1* | 7/2007 | Motherway | H02K 41/031 310/12.22 |
| 2008/0100249 A1 | 5/2008 | Coutu | |
| 2011/0202308 A1* | 8/2011 | Kishida | G01B 7/30 702/151 |
| 2011/0243793 A1* | 10/2011 | Kalin | H02P 8/14 422/67 |

* cited by examiner

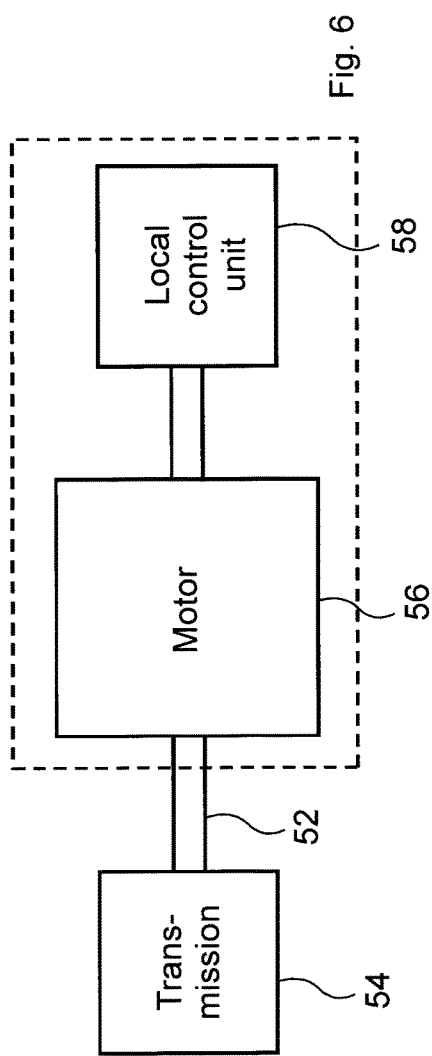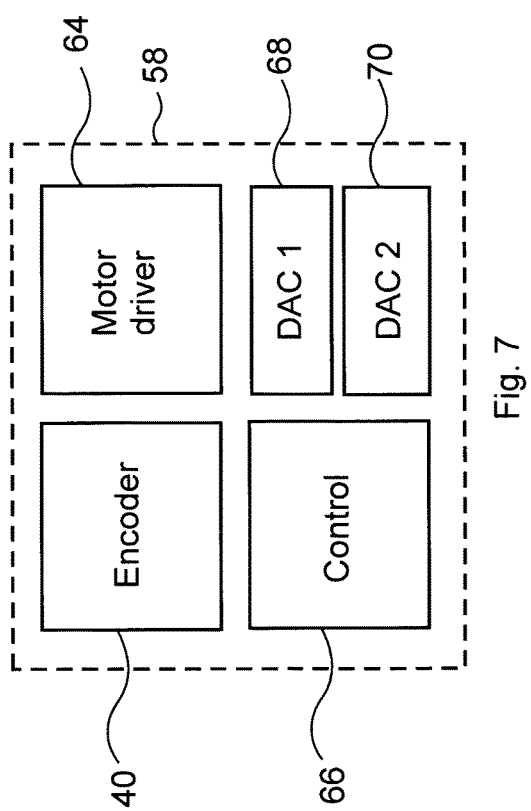

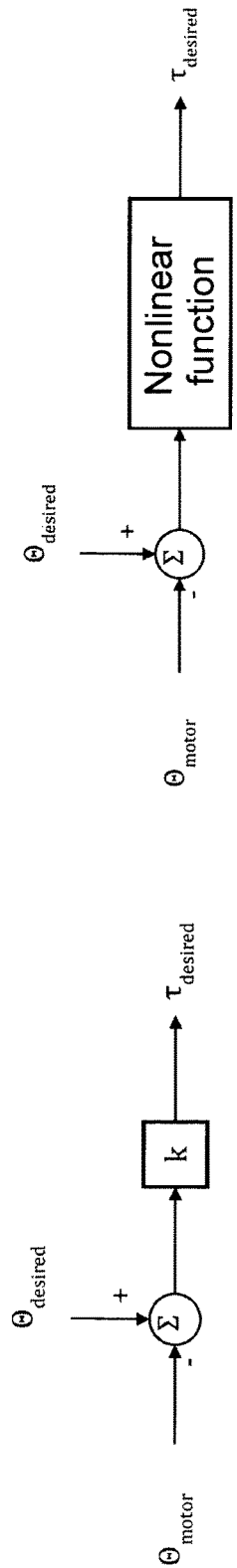
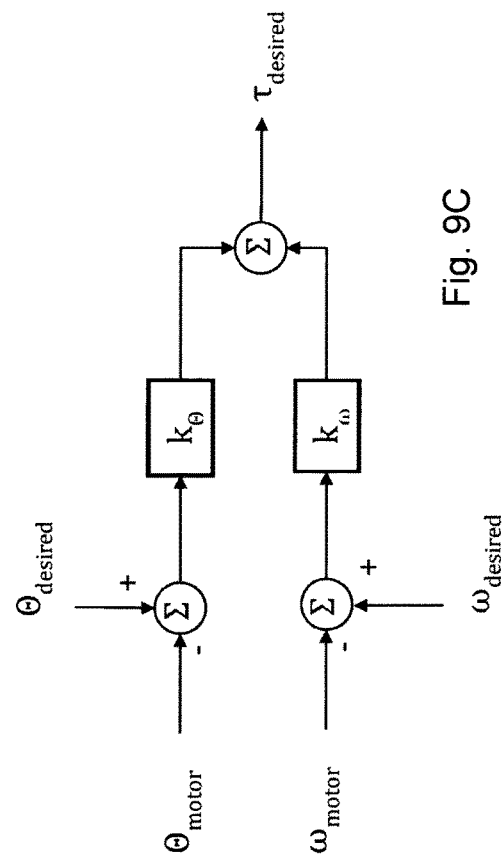
Fig. 9A
Fig. 9B
Fig. 9C

DRIVING MECHANISM

This application claims priority, under Section 371 and/or as a continuation under Section 120, to PCT Application No. PCT/HU2013/000003, filed on Jan. 4, 2013, which claims priority to Hungary Application No. P 1200012, filed on Jan. 5, 2012.

TECHNICAL FIELD

The invention relates to a driving mechanism adapted for exerting a pre-determined torque characteristics, in particular to a driving mechanism applicable in robotics.

BACKGROUND ART

In traditional robotic applications, the robotic arms are of stiff structures so as to enable achieving the highest possible positioning accuracy. Each of the segments of such robotic arms is of large weight and is hard to backdrive, which is not a problem in some of the tasks—e.g. welding or placing—to be carried out. Robots are used for performing such tasks as well, where instead of position-controlling the robotic arm, force-controlling is needed. Such tasks generally comprise interaction with the environment, solved by means of external sensors. End-points of the robotic arms are equipped with a force gauge or torque gauge, so as to enable regulation of the interaction forces acting between the robotic arm and the environment. Force feedback control through feedback is most widely used in robotics.

It is a disadvantage of these solutions, however, that the thereby achieved active control is characterized by a low bandwidth. By that, it is meant that a limited reaction can only be exerted as a response to a sudden change in the force caused by, for instance, a collision. Low bandwidth is due to the latency, i.e. low speed of the force gauge sensors only to a smaller degree, but it is caused mainly by the mechanism of the robotic joints. Known robotic joints are namely characterized by using relatively large transmission ratio so as to achieve the highest possible torque. Consequently, these have a high moment of inertia, and therefore can only react to sudden movement in a restricted measure. The mechanism of robotic joints is hereinafter also referred to as actuators.

This problem represents a significant problem in various fields of robotics. With regard to walking robots, by way of example, in case of the repetitive landings, which means high impact incidents when running or jumping, the robots are unable to react in an appropriate manner due to the aforementioned disadvantages. This problem is in many cases repaired by the insertion of elastic members; one such solution is disclosed in the following study: R. V. Ham, B. Vanderborght, M. V. Damme, B. Verrelst, D. Lefeber, MACCEPA, the mechanically adjustable compliance and controllable equilibrium position actuator: Design and implementation in a biped robot, *Robotics and Autonomous Systems*, Vol. 55, pp. 761-768, (2007). A further example for such a solution is SEA (Series Elastic Actuator) disclosed in patent document U.S. Pat. No. 5,650,704, wherein, generally, a spring is inserted after an electric motor having a transmission of high transmission ratio. This solution may ensure an increased shock-tolerance despite the high moment of inertia caused by the large transmission ratio of the motor. Additionally, the solution enables measurement of the respective torques acting upon the individual actuators in view of the relationship between elongation and torque of the elastic member by means of direct measurement of the deformation of the inserted spring. It is possible to realize force-control on the level of the individual joints with this solution, thereby rendering the system safer. At present, this is the most advanced force-control system being prevalent in this field, but it has several disadvantages, mainly due to the insertion of the elastic member, i.e. the mechanic realization of the elastic behavior.

To solve certain robotic tasks the control of the mechanical impedance is necessary. By way of example, let us refer to robotic arms and legs, wherein structural compliance, namely the force acting against backdrive is to be controlled for the appropriate behavior, i.e. the structure is to have variable stiffness, elasticity. Accordingly, variable elasticity of the adjoining points is to be enabled. To achieve this, in many cases a number of elastic members are inserted in various ways. The known implementations are summed up in the following study: R. van Ham, Th. G. Sugar, B. Vanderborght, K. W. Hollander, and D. Lefeber, Compliant actuator designs, IEEE Robotics & Automation Magazine, Vol. 16, No. 3 (2009), pp. 81-94.

Equilibrium-controlled stiffness: An example for this solution is the aforementioned SEA, wherein virtual stiffness is established by an active control hiding the original parameters of the built-in spring. By measuring the displacement of the joint, by repositioning the non-elongated state of the physical spring, i.e. by displacing its respective end-points, is the desired stiffness—spring constant—attempted to be set. A major disadvantage of this solution is that the variable stiffness is created by low bandwidth force-control, thereby restricting the bandwidth of the elasticity control.

Antagonistic-controlled stiffness. The resultant elasticity of the joint is controlled by means of two springs being tensioned from two directions, similarly to human biceps or triceps. It is a great disadvantage of this solution that for variable resultant elasticity the insertion of springs having non-linear elongation-force characteristics is required, thereby the precise mechanical realization of which makes this solution rather complicated.

Structure-controlled stiffness and mechanically controlled stiffness. These are mechanically complicated solutions and hard to realize particularly in small size.

A modern robotic joint or actuator with variable stiffness all the more can fulfill the expectations, the more and the higher efficiency from the following features can be met:

Backdrivable: The joint is capable to react to impacts, that is, for example, upon external force it can turn in an appropriate degree. Backdrivability is characterized by the percentage of useful torque of the robotic arm, by which it can be rotated back to be backdriven. E.g. if a robotic arm is able to exert a torque of 1 Nm and can be backdriven by a torque of 0.3 Nm, then 30% of the useful torque is required to be exerted for backdriving it, therefore the respective backdrivability of this exemplary robotic arm is 70%.

Suitable for high bandwidth force-control: it is capable to meet demands upon dynamic movement, and having high reaction speed control system.

Capable of variable elastic behavior: suitable for realizing the variation of at least linear spring constant.

Having good mass-force-consumption ratio: low mass, simple mechanical structure, which, in relation to itself can exert an appropriate force, whilst, having low consumption. Keeping consumption at a low rate is of particular significance with mobile robots.

The robotic joint according to the study of A. Albu-Schäffer, C. Ott, U. Frese, and G. Hirzinger, Cartesian impedance control of redundant robots: Recent results with the DLR light-weight-arms, *Proc. IEEE Int. Conf. Robotics and Automation (ICRA '03)*, Vol. 3, pp. 3704-3709 (2003) meets only partly the above features to a satisfactory degree. The joint according to the study, exhibits a limited elasticity only and uses a torque gauge sensor. Robotic joints are disclosed in another study by A. Albu-Schäffer, O. Eiberger, M. Grebenstein, S. Haddadin, C. Ott, T. Wimböck, S. Wolf és G. Hirzinger, Soft Robotics: From Torque Feedback-Controlled Lightweight Robots to Intrinsically Compliant Systems, *IEEE Robotics & Automation Magazine*, Vol. 15, No. 3, pp. 20-30 (2008), as well.

A decisive majority of known robotic joints are not originally backdrivable. The reason behind this is the fact that the various known robotic joints have in most cases an electronic drive mechanism using so-called BLDC (brushless direct current) motors. It is a great disadvantage of the application of BLDC motors that they are designed for a speed significantly higher than the speed generally exerted by a joint. In case of a driving mechanism using BLDC motor, therefore, a transmission of high—many tenfold or even up to hundred-fold—transmission ratio is to be used. The use of high transmission ratio, in many cases causes high frictional loss and increases the moment of inertia of the motor; consequently the robotic joint has a relatively low backdrivability. Partly due to this, the thereby obtained force regulation generated by active control cannot have high bandwidth because of mechanical limitations, accordingly is incapable of manipulating e.g. sudden impact change-of-force.

The study of J. W. Hurst, J. E. Chestnutt, and A. A. Rizzi, An actuator with mechanically adjustable series compliance, *tech. report CMU-RI-TR-04-24, Robotics Institute, Carnegie Mellon University*, April, 2004, discloses a mechanically complex structure for effecting variable elastic behavior, which does not meet any of the above criteria. The same disadvantages characterizing the solution disclosed in WO 2008/015460 A2.

According to the study of D. A. Lawrence, L. Y. Pao, A. C. White, and W. Xu, Low cost actuator and sensor for high-fidelity haptic interfaces, *12th International Symposium on Haptic Interfaces for Virtual Environment and Teleoperator Systems*, 2004, pp. 74-81, a stepper motor is used in a haptic interface. The torque-regulated control of the stepper motor is disclosed in the study. It is furthermore explained in the study that because of the use of stepper motors, an inexpensive actuator can be developed having low friction, no backlash and being ready to exert high torque. It is furthermore explained that use of a transmission is undesirable because of the caused increased moment of inertia.

In robotics, stepper motors are known to be used for positioning only. Such applications are disclosed in the following documents.

In U.S. Pat. No. 4,618,808, U.S. Pat. No. 5,231,342, US 2002/0039012 A1 robotic applications are disclosed, wherein stepper motors are used for conventional positioning purposes.

In U.S. Pat. No. 5,426,722 stepper motors are used also in stepping mode; a robot of multiple degrees of freedom is controlled with stepper motors, with no feedback. In this solution, the individual joints are rotated in discrete steps, and the speed of the turns is controlled by the frequency of stepping.

In U.S. Pat. No. 5,760,503 miniaturizable stepper motors are disclosed. According to the document, the stepper motors are used to directly drive robot arms by means of exploiting the positioning capabilities of the stepper motors.

In US 2010/0234967 A1 it is mentioned that stepper motors could be used in robotic applications, but it is emphasized at the same time that the aforementioned direct current motors are widely used in robotic actuators.

In the study of M. Bodson, J. N. Chiasson, R. T. Novotnak and R. B. Rekowski, High-Performance Nonlinear Feedback Control of a Permanent Magnet Stepper Motor, *IEEE Transactions on Control Systems Technology*, Vol. 1, No. 1, pp. 5-14 (1993) an exemplary solution for linearizing stepper motors is disclosed.

In view of the known solutions the need has arisen to provide a driving mechanism applicable preferably as a robotic joint or actuator, which is capable of exerting a pre-determined torque characteristic. The use of a driving mechanism exerting a pre-determined torque characteristic will enable emulation of movements regulated by various scientific laws.

DESCRIPTION OF THE INVENTION

The primary object of the invention is to provide a driving mechanism which is free of the disadvantages of the prior art solutions to the greatest possible extent.

A further object of the invention is to provide a driving mechanism, preferably to applicable as a robotic joint or an actuator, which is capable of exerting a pre-determined torque characteristic. It is meant by the pre-determined torque characteristic, that the torque characteristic is programmable, and variable in real-time, even during the operation of the driving mechanism.

A yet further object of the invention is to provide a driving mechanism satisfying the aforementioned criteria set towards robotic joints, which has high backdrivability, high bandwidth force control or torque control, capable of variable elastic behavior and characterized by a good mass-force-consumption ratio.

The objects of the invention can be achieved by the driving mechanism according to claim 1. Preferred embodiments of the invention are defined in the dependent claims.

According to the invention, we have recognized that the above objectives can be achieved by a driving mechanism, which comprises a stepper motor for driving the driving mechanism, the motor shaft of the stepper motor is connected to the drive shaft of the driving mechanism by means of transmission, and the behavior to be performed by the driving mechanism is controlled by a local controller. The synergy of these factors is required for the driving mechanism of the invention to fulfill the above objects.

BRIEF DESCRIPTION OF THE DRAWINGS

Preferred embodiments of the invention are described below by way of example with reference to the following drawings, where FIG. 6 is a block diagram of a driving mechanism according to the invention, FIG. 7 is a block diagram of the motor control unit of the driving mechanism according to the invention, FIGS. 9A-9C are principle schemes of the preferred modes of operation of the driving mechanism according to the invention.

MODES FOR CARRYING OUT THE INVENTION

Figure 1:
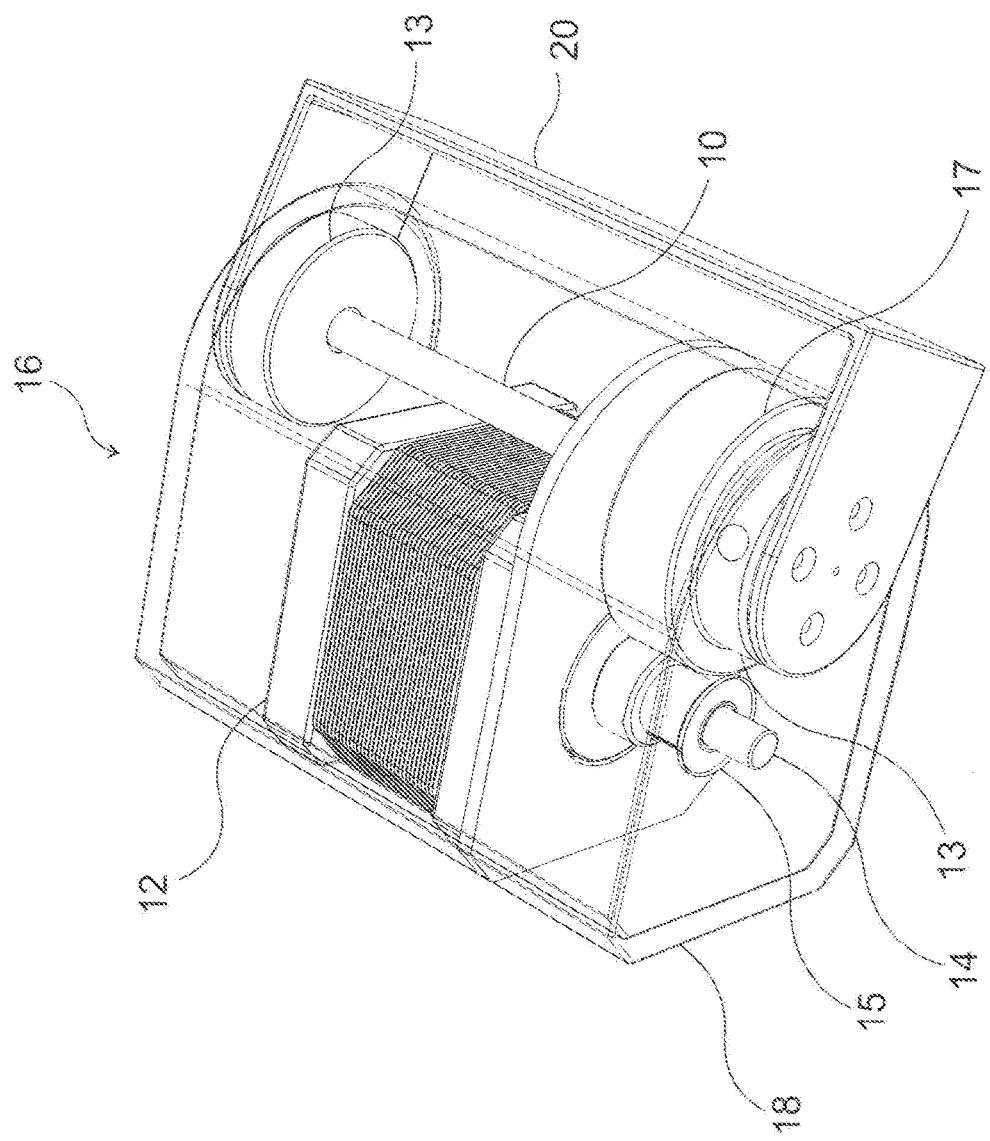
FIG. 1 is a perspective view of an embodiment of the driving mechanism according to the invention, wherein the driving mechanism is enclosed in a casing, and a shackle is mounted to its drive shaft.
Figure 8:
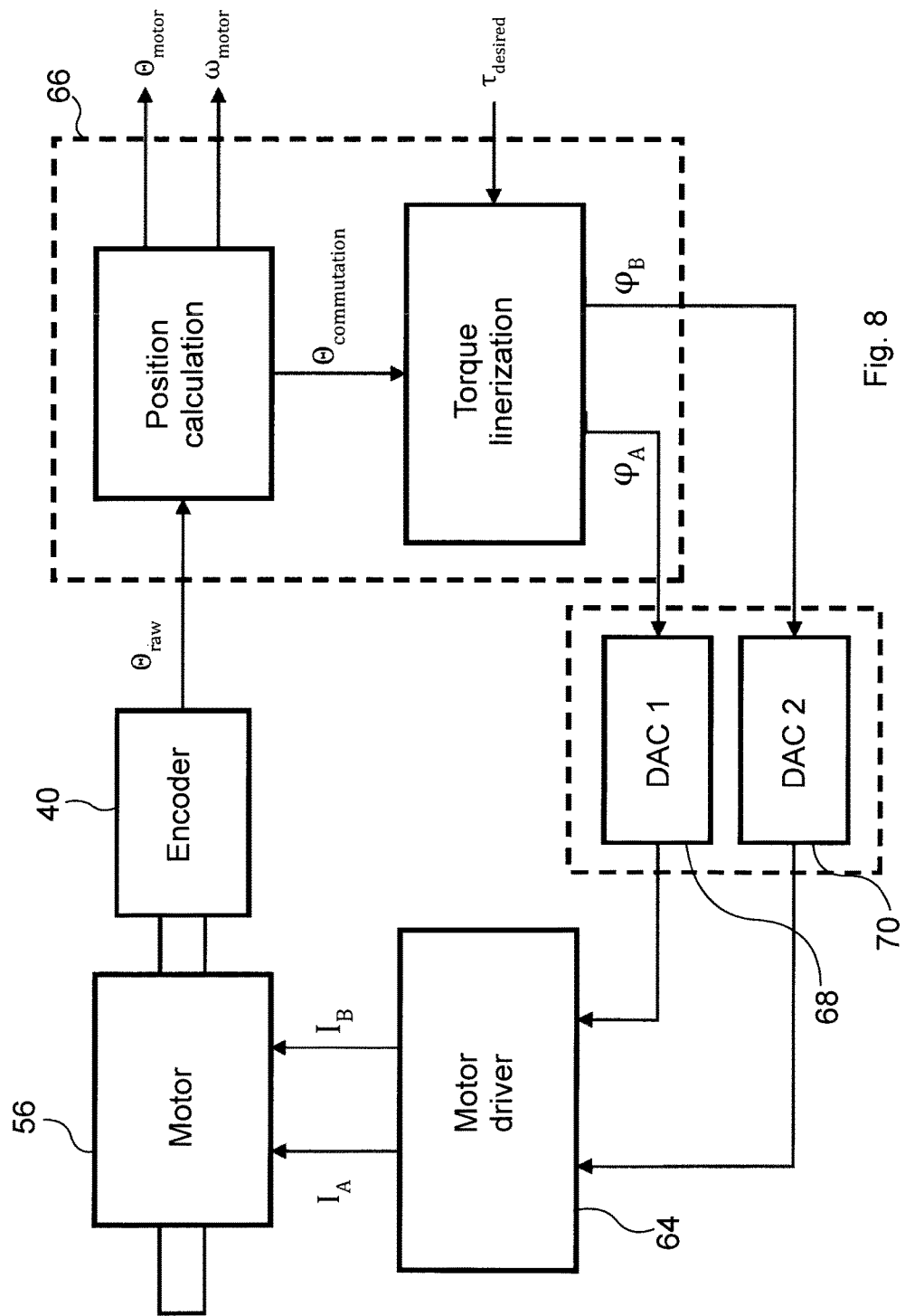
FIG. 8 is a control block diagram of an embodiment of the driving mechanism according to the invention.

FIG. 1 illustrates an embodiment of the driving mechanism according to the invention, which is adapted for exerting a pre-determined torque characteristic. The present embodiment of the driving mechanism comprises a stepper motor 12 having a motor shaft 14, a rotation measuring device detecting the angular position of the motor shaft 14, a motor control unit effecting the torque characteristics on the basis of the angular position of the motor shaft 14, a drive shaft 10 exerting the torque characteristic, and a essentially backlash-free transmission connecting the drive shaft 10 with the motor shaft 14. It is meant by the backlash-free transmission that the transmission provides an essentially continuous force-transmission between the motor shaft and the drive shaft. The motor control unit is a local motor control unit 58 providing operating signals to the stepper motor 12 and being programmable in at least one parameter. The partial units of the motor control unit 58 are shown in the block diagram of FIG. 7; while the operating principle of the motor control unit 58 is illustrated in FIG. 8. The embodiment of the driving mechanism, shown in FIG. 1 is arranged in a casing 18 forming an integral unit 16 with a shackle 20 attached to the drive shaft 10. A disc 15 attached to the motor shaft 14 and a disc 17 attached to the drive shaft 10 is illustrated in FIG. 1 as well. The transmission being fitted to the discs 15, 17 is demonstrated in FIG. 3. The discs 13 enabling coupling of the shackle 20 to the drive shaft 10 are also shown in FIG. 1. The ends of the shackle 20 are attached to the discs 13, as seen in the figure. The unit 16 incorporating the present embodiment of the driving mechanism according to the invention, can prefer-ably be used as a robotic joint; some exemplary applications thereof are presented herebelow.

The application of stepper motors as compared to prior art BLDC motors is particularly advantageous because of their high pole number, and therefore their capability of exerting high torque at a low speed. This enables to develop driving mechanisms using stepper motors having very small transmission ratio. As the moment of inertia of the driving mechanism is proportional to the square of the applied transmission ratio, therefore the use of a transmission ratio smaller by one order will decrease the moment of inertia of the driving mechanism by essentially two orders. The low transmission ratio can be implemented, e.g. by means of a timing belt, i.e. toothed belt, or cable transmission. The transmission must have low frictional loss, no backlash, i.e. no play, all of which are satisfied by these types of transmissions. The relatively small transmission ratio ensures backdrivability of the driving mechanism. The torque of the driving mechanism is relatively low with this transmission; therefore the driving mechanism is backdrivable. By the use of the driving mechanism according to the invention—in dependence of the transmission ratio—backdrivability of over 90% can even be achieved. This backdrivability indicates passive backdrivability, i.e. in the off state of the stepper motor. Accordingly, the driving mechanism according to the invention can be backdriven even without control of the stepper motor.

The use of transmission is necessarily required with the driving mechanism according to the invention. With the broadly used mass-produced stepper motors transmission is required, so that driving mechanism made thereof can exert sufficient torque to perform the tasks of a robotic joint. A direct-driven driving mechanism could not produce sufficient torque required for such practical applications.

Figure 2A:
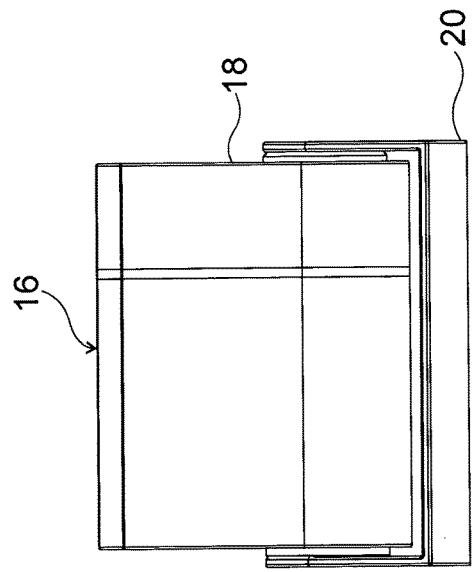
FIGS. 2A-2D are the perspective views of the driving mechanism of FIG. 1 enclosed into a casing and fitted with a shackle, in various views.
Figure 2B:
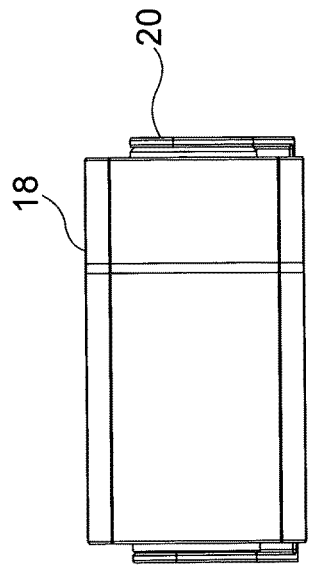
Figure 2C:
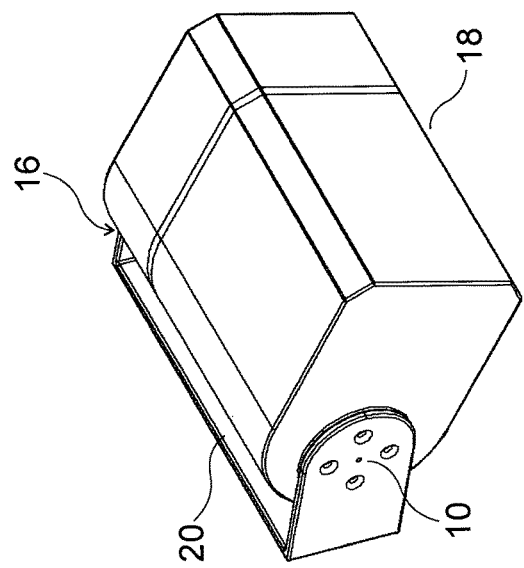
Figure 2D:
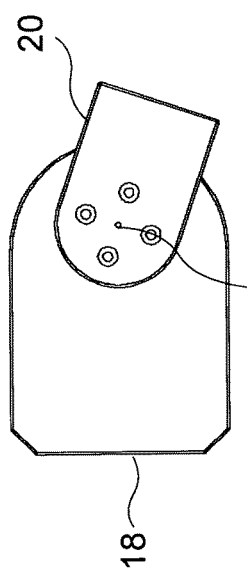

FIGS. 2A-2D illustrate the unit 16 in various views. In FIG. 2A the unit 16 is shown in a perspective view. The unit 16 shown may form a robotic joint by having the shackle 20 and the casing 18 attached to two respective parts of the arm connected to the joint, as seen exemplary in FIGS. 12 and 14. FIG. 2B shows a top view, FIG. 2C shows a side view, while FIG. 2D is another side view of the unit 16.

Figure 3:
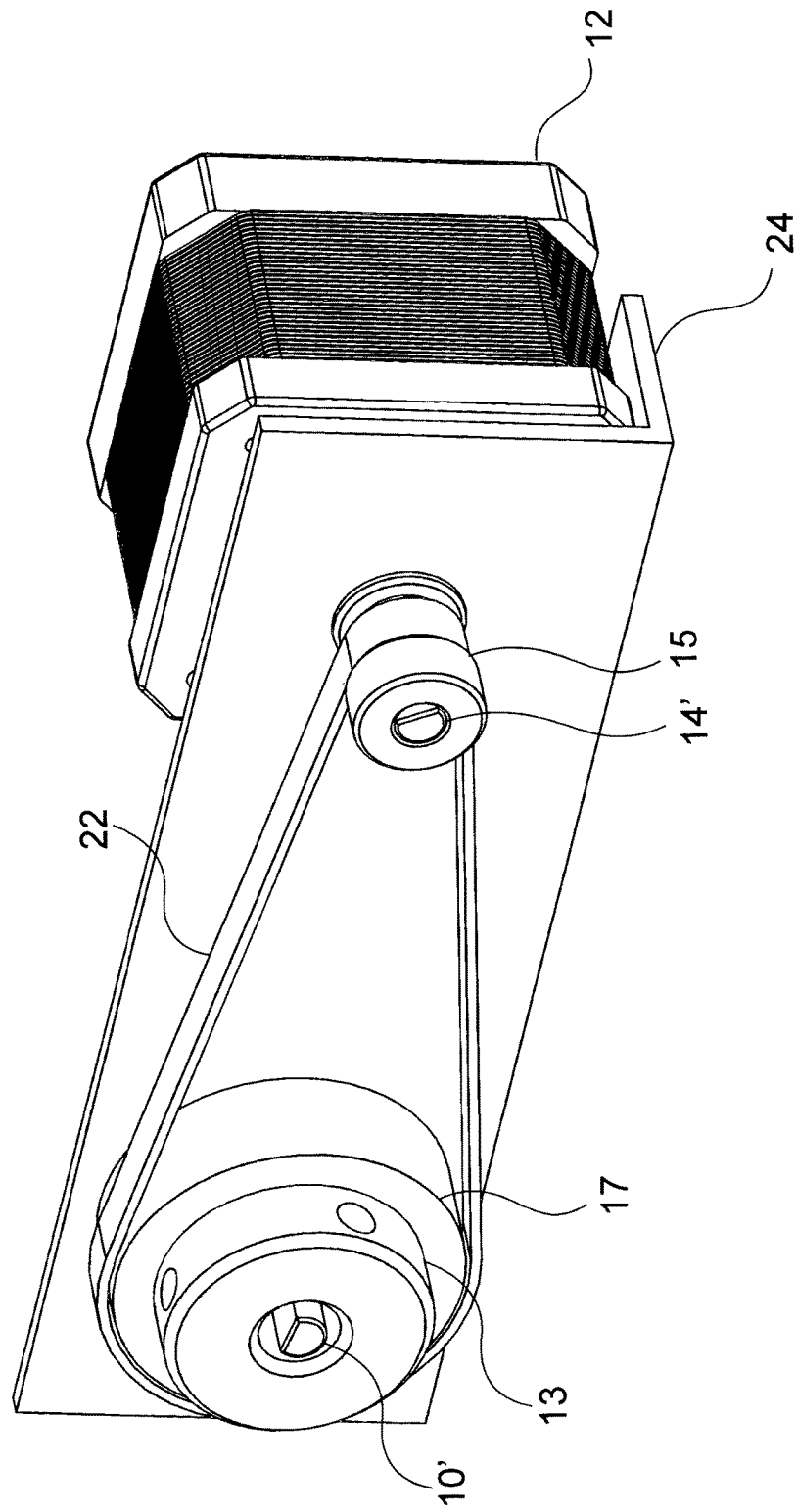
FIG. 3 is a perspective view of another embodiment of the driving mechanism according to the present invention.

In FIG. 3 another embodiment of the driving mechanism according to the invention is shown. In the present embodiment, the driving mechanism comprises a drive shaft 10' and a motor shaft 14', connected by means of a timing belt transmission 22. Disc 17 is attached to the drive shaft 10', while disc 15 is attached to the motor shaft 14'. The timing belt transmission 22 connects the drive shaft 10' with the motor shaft 14' in a known manner through discs 17 and 15. In the present embodiment the stepper motor 12 driving the motor shaft 14' is mounted to a frame 24. The drive shaft 10' and the motor shaft 14' are fed through the frame 24 and are mounted thereto in such a manner that the frame 24 will not obstruct their movement.

Figure 4:
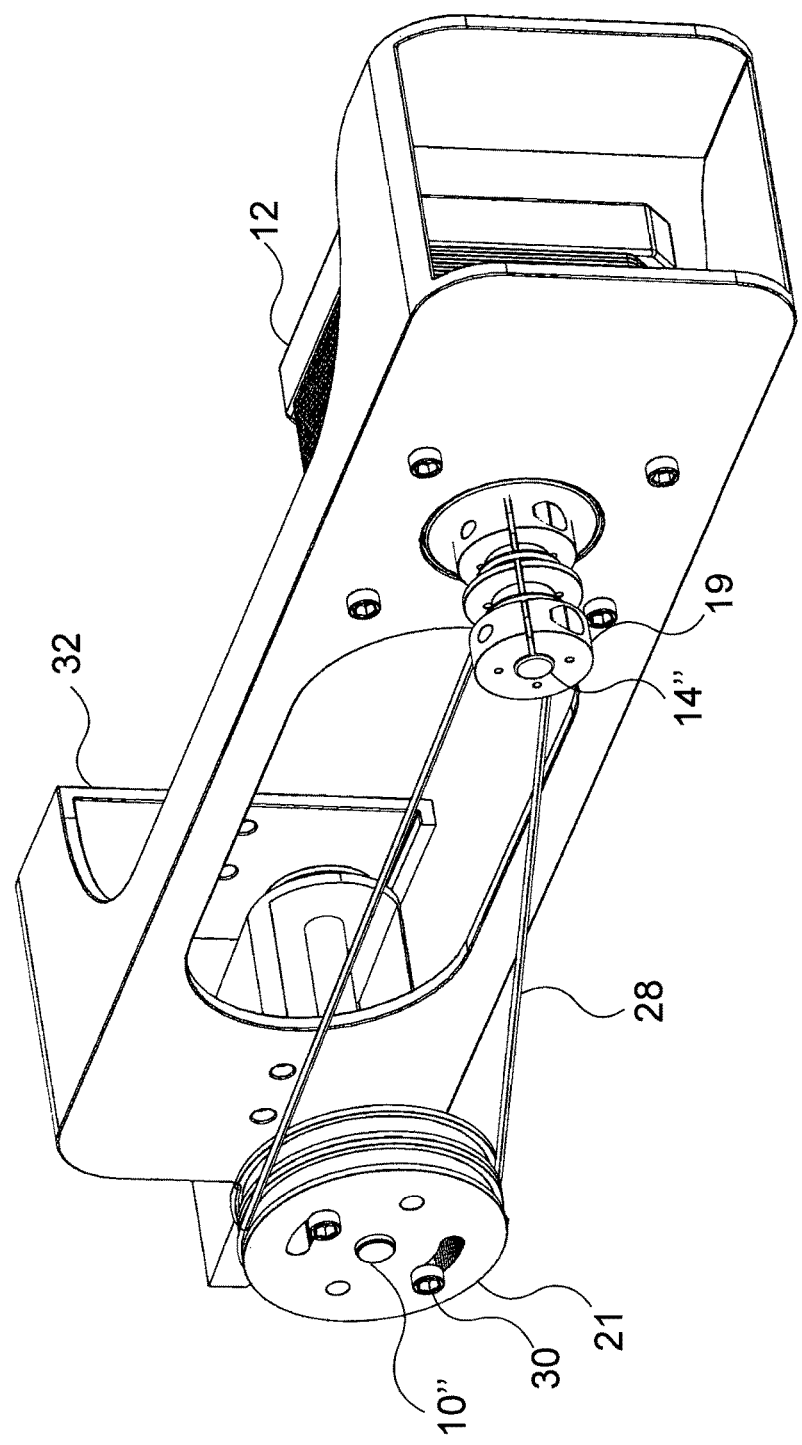
FIG. 4 is a perspective view of a further embodiment of the driving mechanism according to the present invention.

In FIG. 4 a yet another embodiment of the driving mechanism according to the invention is shown. In the present embodiment the driving mechanism comprises a drive shaft 10" and a motor shaft 14", connected by a cable transmission 28. The cable transmission 28 connects the drive shaft 10" with the motor shaft 14" in a known manner through discs 21 and 19. The cable driving realized with the cable transmission 28, e.g. a thin steel cable is used. It is evident from the figure, that the driving mechanism in the present embodiment comprises tensioning elements 30 for tensioning the cable transmission 28, fixing the end of the cable hold tight on the discs 21. Therefore, the cable transmission 28 cannot be made endless, the rotation angle of the drive shaft 10" is maximized, e.g. in 360° or 720°. The robotic applications of the driving mechanism generally do not require a larger rotation. In case of necessity of larger rotation, the embodiment of the driving mechanism according to the present invention shown in FIG. 3 can be applied.

The most important field of application of the driving mechanism according to the invention is the realization of robotic limbs or joints. Consequently, the mass of the entire driving mechanism is a factor of great importance. In order to ensure the proper use of the driving mechanism according to the invention in robotic arms, the optimal mass-force-consumption ratio is to be pursued. The driving mechanism is to be designed with the appropriate transmission so as to enable a relatively high torque to be exerted by the smallest possible stepper motor. Moreover, due to its function, the driving mechanism has to be backlash-free and backdrivable. Eliminating backlash, i.e. without play, is of great significance in terms of continuous transmission of force—the appropriate production of the movement to be emulated can be ensured only by this way—moreover, good efficiency and transmission ratio are important to ensure backdrivability of the driving mechanism.

The timing belt transmission 22 and cable transmission 28 as presented in FIGS. 3 and 4 satisfy all of the below criteria, nevertheless the use of other type transmission is also possible. The transmission must be able to realize small transmission ratio, based on our measurements, the objects of the present invention can be achieved if the transmission ratio falls within the range of 2:1-10:1, have essentially no play, i.e. no backlash, so as to ensure continuous transmission of force between the motor shaft and the drive shaft, have an efficiency as high as approx. 90%, i.e. very low friction, cannot be self-locking, due to the required backdrivability.

A transmission is self-locking, if the motor shaft cannot be turned by the drive shaft, for example, due to friction circumstances. Self-locking is e.g. caused by a large transmission ratio realized by gear-wheels. A gear-wheel drive generally cannot realize playless transmission.

The harmonic drive disclosed in U.S. Pat. No. 2,906,143 and U.S. Pat. No. 3,161,081 can realize an essentially backlash-free transmission. The harmonic drive can be realized by means of a precision mechanism comprising an elastically deformable sleeve, which means high costs. By the use of the harmonic drive a typical transmission ratio of larger than 50:1 is realized. The relatively small transmission ratio required for the driving mechanism according to the invention cannot be realized by harmonic drive or only at a very bad efficiency. The use of harmonic drive is advantageous for the BLDC motors nowadays commonly applied in robotic joints.

In the driving mechanism according to the invention, the joint existence of the following factors results that the driving mechanism can be especially preferably applied in robotic joints:

the motor is a stepper motor having pole number between 25-100, the transmission is essentially playless, i.e. backlash-free (timing belt-disc, cable transmission)

transmission ratio is between 2:1 and 10:1

Our measurements show that a transmission ratio between 2:1 and 10:1 ensures that the driving mechanism according to the invention meets the aforementioned criteria set for robotic joints and actuators. More preferably, the transmission ratio falls in the range of 2:1 to 5:1, for achieving the highest possible torque by the driving mechanism, whilst having appropriate backdrivability. We have found that the transmission ratios in this range are extremely preferably used for present-day robotic applications, robotic joints. More preferably, the transmission ratio falls within the range of 3:1 to 4:1. In view of the torque to be exerted and of the backdrivability the most advantageous state falls within this range. Furthermore, our experiments showed that a backdrivability within this range performing a movement most similar to human movement.

Figure 5:
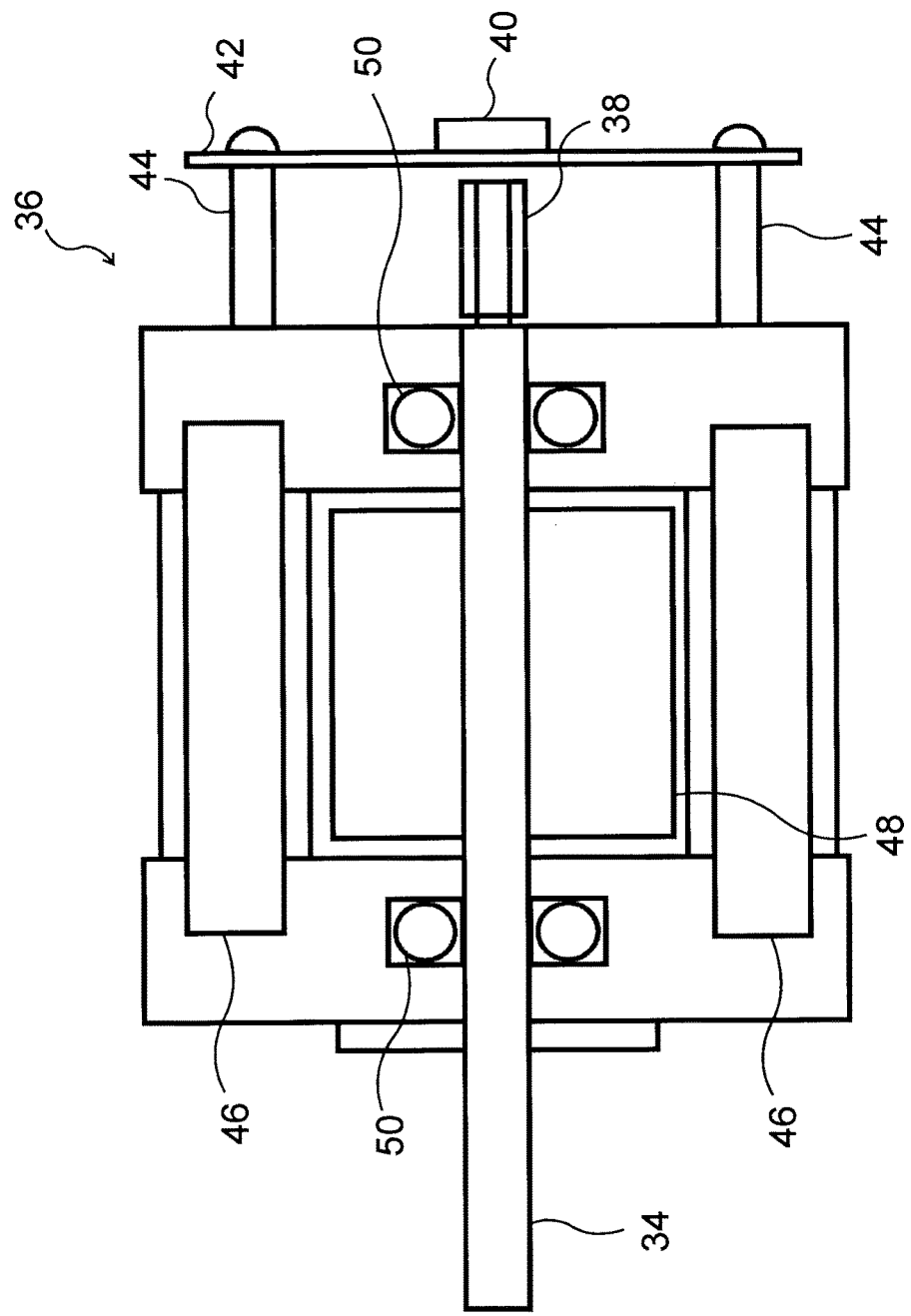
FIG. 5 is a sectional view of the stepper motor and rotation measuring device used in one embodiment of the driving mechanism according to the invention.

All of the embodiments of the driving mechanism according to the invention comprise a stepper motor; in FIG. 5 a schematic view of an exemplary stepper motor 36 is illustrated. The major elements of the stepper motor 36 are shown in the figure: a motor shaft 34, coils 46, rotor 48 and bearings 50. Their mode of connection as well as the operation of the stepper motor is known. In FIG. 5 it is clearly seen that a magnet 38 is attached to the right side end of the motor shaft 34. A plate 42 is attached to the housing of the stepper motor 36 by means of elements 44. An encoder 40 is arranged on the plate 42, which encoder is in interaction with the magnet 38. The angular position of the motor shaft 34 is given by the interaction between the magnet 38 and the encoder 40; the magnet 38 and the encoder 40 together constitute a rotation measuring device. The angular position of the motor shaft 34 can be determined by other methods, for example by means of optical methods, as well.

Determining the angular position of the motor shaft by means of a magnetic rotation measuring device is possible with lower accuracy, than that of by means of optical angle determination according to the prior art. The use of magnetic rotation measuring device, however, has several advantages, and the aforementioned lower accuracy will not cause any perceivable error in the fields of the application of the invention, as the stepper motor of the driving mechanism is not used for traditional positioning tasks. As compared to prior art optical sensor solutions, the fields of application of the solution according to the invention require a lower accuracy rotation measuring device. The primary field of application of the driving mechanism according to the invention applies to the emulation of elasticity, for example, the simulation of linear or non-linear springs. In this field of application, the error coming from the lower resolution of the magnetic rotation measuring device than that of the optical sensor, is negligible.

Contrary to the optical sensor, the use of magnetic rotation measuring device has also the advantage that there is no error due to contamination, what can make optical sensors to be unusable. Moreover, owing to its simpler structure, the magnetic rotation measuring device incurs lower costs. Therefore, the use of magnetic rotation measuring device in the driving mechanism according to the invention is more advantageous than that of an optical sensor.

In FIG. 6 a block diagram of the driving mechanism according to the invention is shown. The major parts of the driving mechanism, such as a stepper motor 56, a transmission 54 attached to the stepper motor 56 via motor shaft 52, and a motor control unit 58 being also connected to the stepper motor 56, are shown in the figure. The transmission 54 as seen in the drawing is located in the front of the motor shaft 52, while the motor control unit 58 is arranged in the rear of the stepper motor 56, nevertheless other arrangement is also possible.

In FIG. 7 the parts of the motor control unit 58, such as an encoder 40, a motor driver 64, a controller 66—for example a micro controller, which is in a preferred embodiment a 16 bit microcontroller—as well as digital-to-analog converters 68 and 70, are shown. The encoder 40 is a magnetic encoder, if the driving mechanism is provided with a magnetic rotation measuring device. The operation of the encoder is demonstrated in FIG. 5: by mounting a magnet 38 onto the rear end of the motor shaft 34 of the stepper motor 36 and rotating it in front of the surface of the magnetic encoder 40 it enables determining the angular position of the motor shaft 34.

In FIG. 8 the operating principle of the driving mechanism according to the invention is illustrated, with special regard to the operation of the motor control unit 58. The angular position of the motor shaft of the stepper motor 56 is measured by means of the encoder 40 in a manner described above; the raw output of the encoder 40 is angle $\Theta_{raw}$. From angle $\Theta_{raw}$, exact angle $\Theta_{motor}$ of the stepper motor 56 is processed by the controller 66 and angular speed $\omega_{motor}$ of the stepper motor 56 is calculated by means of time difference. Then, feedback angle $\Theta_{commutation}$ is determined by the controller 66, which is the product of the angle $\Theta_{motor}$ and the pole number of the stepper motor 56. The stepper motor 56 used in the driving mechanism according to the invention preferably has a pole number of about 50. By using the calculated angles, we carry out torque linearization in the controller 66. The torque linearization enables the stepper motors to be used in force-controlled and torque-controlled modes instead of the widely used stepping mode. In case of a known two-phase bipolar stepper motor, torque linearization is carried out as follows.

The torque dependence of the stepper motor on the currents of the coil of the stepper motor given by the following formula:

$$\tau = -K_m[I_A * \sin(\Theta_{commutation}) - I_B * \cos(\Theta_{commutation})],$$

where $\tau$ is the momentary torque of the stepper motor, $K_m$ is the constant of the stepper motor, $I_A$ and $I_B$ are the respective momentary current values in the two coils of the motor. If, in light of the above formula, the values of $I_A$ and $I_B$ are chosen in dependence of the angle of feedback $\Theta_{commutation}$ so that $$I_A = I^* \sin(\Theta_{commutation}) \text{ and } I_B = -I^* \cos(\Theta_{commutation})$$

then the formula of the torque is simplified to:

$$\tau = -K_m I.$$

The formula indicates a linear relationship between parameters I and $\tau$. If, therefore, the stepper motor receives control parameters computed in accordance with the above, the traditionally position-controlled stepper motor will be enabled to be used in a torque-controlled mode of operation. As will be described below, this will enable a plurality of functions to be carried out by the stepper motor.

FIG. 8 shows, how in one embodiment of the motor control unit 58, the controller 66 transmits a desired torque $\tau_{desired}$ to the stepper motor 56 via the motor driver 64. Two phases of digital current values $\varphi_a$, $\varphi_b$ belong to torque $\tau_{desired}$ in case of a two-phase bipolar stepper motor. The controller 66 converts the current values $\varphi_a$, $\varphi_b$ to analog signals by means of digital-to-analog converters 68 and 70, which values therefore will be received by the motor driver 64 of the stepper motor 56 as analog signals. Based on the analog signals, the motor driver 64 produces the currents $I_A$, $I_B$ of the respective coils of the stepper motor 56 means of pulse width modulation, thereby generating the desired torque $\tau_{desired}$ at the output of the stepper motor 56.

The driving mechanism according to the invention is suitable for producing the actual torque in such a manner that the driving mechanism carries out some elastic behavior as dynamic movement. In FIGS. 9A and 9B the establishments of two different elastic behaviors are illustrated. In FIG. 9A an emulation of a linear spring model and FIG. 9B emulation of a non-linear spring model is illustrated, respectively. In addition to the aforementioned references, a further reference is indicated in the figures, namely $\Theta_{desired}$, being a parameter of the movement to be emulated, by way of example the angle of equilibrium position of the spring. Knowing $\Theta_{desired}$ and $\Theta_{motor}$, and thus knowing the behavior to be emulated, indicated in the drawing by a square, the torque $\tau_{desired}$ required to carry out such to be emulated behavior can be given. In case of emulating a simple linear spring, the torque $\tau_{desired}$ to be produced is given by weighting the angle of displacement $\Theta_{desired}$ desired of the spring by a spring constant as per Hooke's law:

$$\tau_{desired} = k(\Theta_{motor} - \Theta_{desired}),$$

where spring constant k can be adjusted even in the course of the operation of the driving mechanism. In a given position of the driving mechanism, a torque as per Hooke's law is produced in a manner as described hereabove. Therefore, for example, an elasticity having adjustable spring constant is possible to be emulated. This method enables to emulate non-linear—moreover adjustable—elasticity, as the spring constant k in the above formula of the torque to be produced can be changed to any arbitrary function, e.g. to a nonlinear function as depicted in FIG. 9B. In the light of the above, the elastic behavior of the driving mechanism can be achieved by means of the motor control unit, without the need to interpose an elastic element.

By means of the driving mechanism according to the invention, a more complex elastic behavior can also be emulated, e.g. a behavior corresponding to the damped spring model as illustrated in FIG. 9C. As previously, in this case also a spring constant $k_\Theta$ corresponding to the behavior can be set, just as well the rate of damping $k_\omega$, proportional to the angular speed. In this to be emulated movement appears an angular speed $\omega_{desired}$ to which the damped system upon damping tends. Of course, the signs of both constants can be changed freely, which means that not only damping but also oscillation may be induced.

According to the above discussion, not the mass itself of the driving mechanism, but the mass-force-consumption ratio as described above is of importance. Of course, the respective masses of the driving mechanism and the stepper motor used therein also play a significant role: if the mass were of no importance, then direct driving would also be possible to be used. The driving mechanism according to the invention is especially preferable in such applications, where the issue of mass, force and consumption are just as critical. One such field of application is mobile robotics, especially robotic arm and leg configurations. In every mobile robotic system, consumption is a core problem, since there is no available power line as opposed to fix robots. Additionally, as these robots have to move their own masses, the aspect of mass plays an important role as well. In robotic applications, the driving mechanism has to have sufficient force for the mobile robot to move its own mass.

The coincidence of these three properties is nontrivial. An elastic behavior of the driving mechanism could be obtained by means of a large motor as well, but then the mass of the driving mechanism would not be adequate. It could also be realized by means of a small motor, but in this case the driving mechanism would have high consumption. In case of a small motor and low consumption, the driving mechanism would not have sufficient force.

In the following the advantageous applicability of the driving mechanism according to the invention in robotic devices will be discussed. In a known biped robot—i.e. ERNIE, developed at the Ohio State University—BLDC motor is used. The total mass of this BLDC motor is approx. 1150 g, which is compared to a 988 g stepper motor. Both motors can produce a torque of several Nm, their consumption is, however, questionable. The proper index-number thereof is the so-called motor constant, which indicates the torque produced by the given motor at a power of 1 W. With the BLDC motor, this is 70 mNm, while with the stepper motor this value is 0.5 Nm, i.e. the motor constant of the stepper is higher by approx. one order. By using the BLDC motor in the driving mechanism according to the invention, we would achieve 7.1 times higher torque with 50 times higher consumption. Regarding the motor construction, this is because of the more pole pairs of the stepper motor than that of the BLDC motor.

Figure 10:
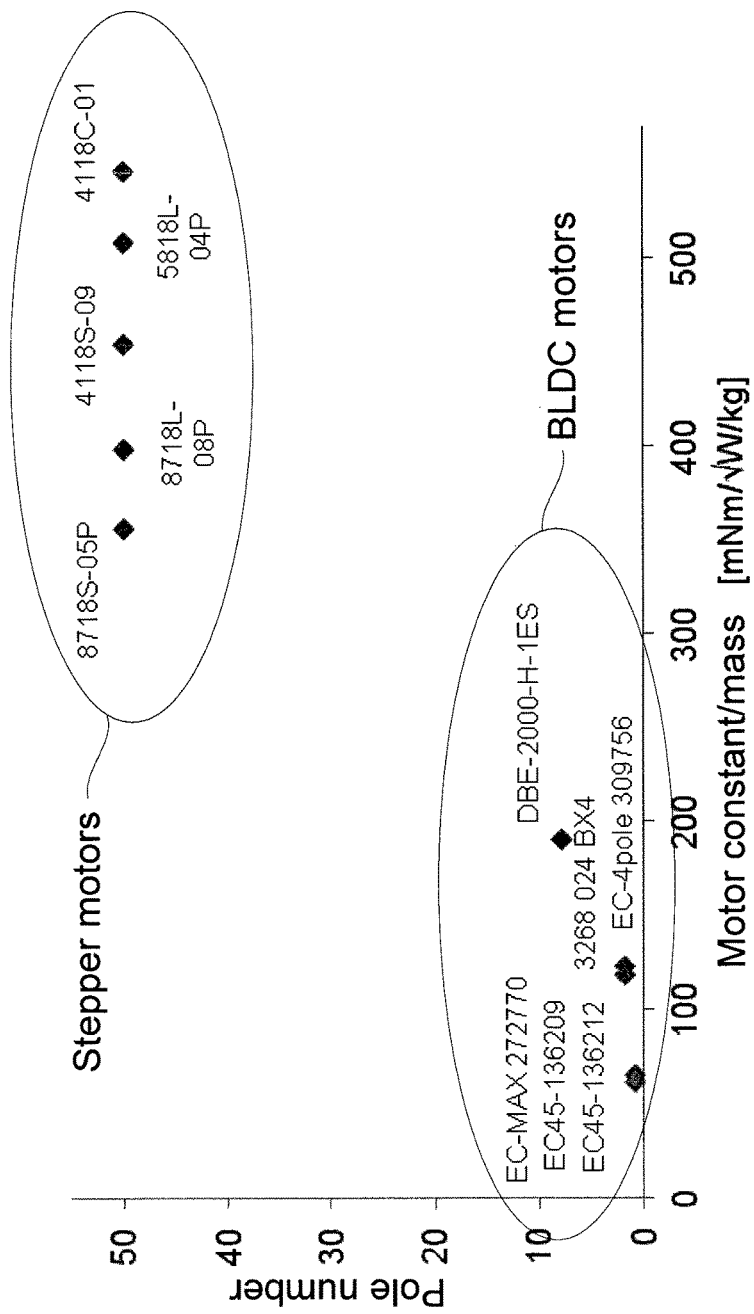
FIG. 10 is a comparative graph of the parameters of the BLDC motors and stepper motors.

FIG. 10 is a graph representing a comparison of a plurality of various BLDC motors and stepper motors as a function of motor constant-weight ratio and pole number. The dots of the lower left-hand corner belong to the group of BLDC motors, while the ones of the upper right-hand corner belong to the group of stepper motors. The graph represents a comparison of the respective data of BLDC motors manufactured by Maxon, Faulhaber and Moog and stepper motors manufactured by Linengineering. A definite separation by motor types can be observed, which is due to the fact that BLDC motors are designed for high speed, while stepper motors are designed for producing high torque.

The limits of the emulation of elastic behavior are composed by the following factors. On the one hand, there is a physical limit to the strength of the motor used for emulation purposes, i.e. what strength of a spring can be emulated. Moreover, the dynamic torque of the motor—the torque as a function of speed—limits the maximum speed and acceleration. For example, in case of modeling a linear spring, on basis of the moment of inertia and dynamic torque, the maximum spring constant which can be emulated, can be given. Additionally, another limiting factor is the motor electronic.

The limiting factors will be illustrated by way of the following examples. Assuming that an infinitely strong motor is used in the driving mechanism, having an infinite dynamic torque, i.e. is capable of producing any torque at any speed. In this case, the only limiting factor would be any possible delay in the iteration of the motor control parameters. For example, in case of emulation of a linear spring, it will limiting the spring constant. The time delay may be caused, for example, by the finite sampling frequency.

A linear spring is described by the following law:

$$\tau = k*\Theta,$$

where $\tau$ is the momentary torque, k is spring constant and $\Theta$ is the momentary angle of displacement from equilibrium of the torsion spring. The driving mechanism emulating the movement should be controlled by the torque of the momentary angular position, nevertheless, due to the time delay, the actual control is affected by a torque of a different angular position. This phenomenon would greatly degrade the accuracy of the emulation, and could, moreover, instabilize the system if oscillation would arise.

For the above reasons, it is of extraordinary importance in case of emulation of elastic behavior, to realize the model of elastic behavior at a local level. Accordingly, the control of the driving mechanism according to the invention is split up into two parts: to a local control computing and transmitting the control currents required for the stepper motor for the emulation behavior; and to a global control, which essentially enables setting of the parameters of the to be emulated motion, such as the spring constant in case of linear spring emulation. By such division of the control the problem of the time delay can essentially be eliminated by reducing the time delay by one order, as the movement in accordance with the physical laws is controlled by the local controller. Thus, the driving mechanism according to the invention does not require the time-delaying connection with the global control for momentarily performing the dynamic movement.

Such division of control cannot be found in the prior art haptic device described above. In case of haptic devices, there is actually no need for this, as their major field of application is the emulation of a driving force in virtual reality. In haptic devices, the user moves a haptic interface as input device, thereby controlling an object in the virtual space, its collision behavior being calculated by the computer generating the virtual reality, and the computed impact is then transmitted to the haptic device, producing appropriate torque at its output. The time delay in the range of 1-10 ms, due to the datapath in the haptic device, is imperceptible to the user; therefore it does not cause any problem in these known solutions.

By the use of a local controller in the driving mechanism according to the invention, we can reduce the time delay by over one order. Emulation of elastic behavior by means of the presented haptic device could not be achieved in robotic devices in an acceptable quality.

Furthermore, it is be noted with reference to the prior art haptic device, that it serves an object essentially different from that of the driving mechanism according to the invention, therefore it cannot be implicitly implemented for a driving mechanism used in robotic devices. The use of transmission is not recommended in the prior art haptic device due to possible increase of friction, decrease of backdrivability, and increase of moment of inertia. We have recognized and explained that in spite of the use of a transmission in the driving mechanism according to the invention such negative effects will not appear, or could significantly be decreased. In accordance with the above, the use of timing belt transmission or cable transmission will not cause significant increase of friction. The use of an appropriate transmission will result in an acceptable, or rather outstanding—over 90%—backdrivability and increased energy efficiency. Accordingly, the moment of inertia of the driving mechanism according to the invention will remain within manageable limits, and will not cause a negative effect. In the prior art haptic device no transmission is used, as it is not necessary for the actuator to have low total mass, it is only the mass to be moved by the motor that is required to be low.

It is to be further noted, that haptic devices are originally input devices. The driving mechanism according to the invention is, on the contrary, a robotic actuator primarily suitable for moving objects attached to the output of the driving mechanism; therefore it is fundamentally used for producing dynamic movements. The haptic device is the master part of a master-slave system, a human-machine input interface moved by the user. The driving mechanism according to the invention functions as slave in the master-slave relationship, as in case of, e.g. the walking robotic leg, the movement patterns and commands are received from outside, from the global controller system. It is to be meant that in case of the driving mechanism according to the invention, the movement pattern is given by the global controller, while the local controller is responsible only for implementing the dynamic movement, i.e. computing the actual torque and transmitting it to the motor.

The separation of global and local controllers is a difference in comparison with the known robotic driving mechanisms, actuators. In case of conventional non-mobile robotic actuators, the controller is arranged in a separate control cabinet. Accordingly, the feedback, i.e. the connection of the sensor signal tracking the movement of the actuators with the motor control, is performed not directly at the motor driving the actuators, but the motor control signals are created in a separate control cabinet. Accordingly, the signals have to run over an unfavorably long distance, moreover, for forwarding the signals well-screened cables are required, which, in addition to the drawback of the time delay, hamper the movement of the actuator or the robot itself. On contrary, according to the invention the signal from the rotation measuring device measuring the angular position of the stepping motor shaft is processed by the local controller arranged at the stepper motor, on basis of which the local controller implements the control of the dynamic movement of the actuator.

In addition to the above, there are known such robots as well, wherein a part of the tasks of the control cabinet is taken over, whilst the task of carrying out global level control remains with the control cabinet. In such cases, however, sensor signals are yet to be transmitted to the control cabinet and connection is required to the power supply.

Effecting the behavior according to the spring model according to the invention by means of the local controller, then only the shorter and quicker datapath is used between the sensors and the local controller for implementing the movement, thereby relieving the global controller. In sense of this change, the parameters of the movement to be emulated are set only at the level of the global controller, which may also be done through a relatively slow connection, while realization of the movement is performed at the level of the local controller.

In the following some further technical advantages of the driving mechanism according to the invention are listed.

In case of a robotic leg built by means of the aforementioned known actuators, the passive dynamic cannot take effect, since the known actuators cannot generally be back-driven by external forces or only to a very limited extent. The rate of backdrivability of known actuators and driving mechanisms is significantly behind the 90% backdrivability of the driving mechanism according to the invention. In the driving mechanism according to the invention, the passive forces, such as the gravitation, for example in the swing phase of walking, can be effective. This can save significant amounts of energy, moreover, in case of a robotic leg, it will result a more natural walking. Accordingly, by the use of the driving mechanism of the invention, a robot can be created reacting to external forces in a natural manner; moreover, and in the course of natural movement while walking the observable swinging of the leg can be realized.

When swinging the driving mechanism according to the invention, the leg is freely moveable, i.e. against a minor torque defined by backdrivability, as opposed to robotic legs mounted with the known actuators, wherein when swinging a robotic joint is rotatable upon energy feed in. Consequently, a part of the energy absorbed during a given landing becomes utilizable, which further increases the energy efficiency of walking. For this reason, in the course of walking, the impact of landing is damped—like the compression of a conventional spring—meanwhile energy is stored, which is then released in the next take off phase from the ground. The embodiment of this driving mechanism according to the invention comprises a stepper motor operable in generator mode as well. Thus, in the course of walking more dynamic movements, such as running or jumping, can be achieved with increased energy efficiency. Meanwhile the advantages—such as freely adjustable spring constant or damping—of the driving mechanism maintained as compared to the solutions comprising physical springs.

Figure 11:
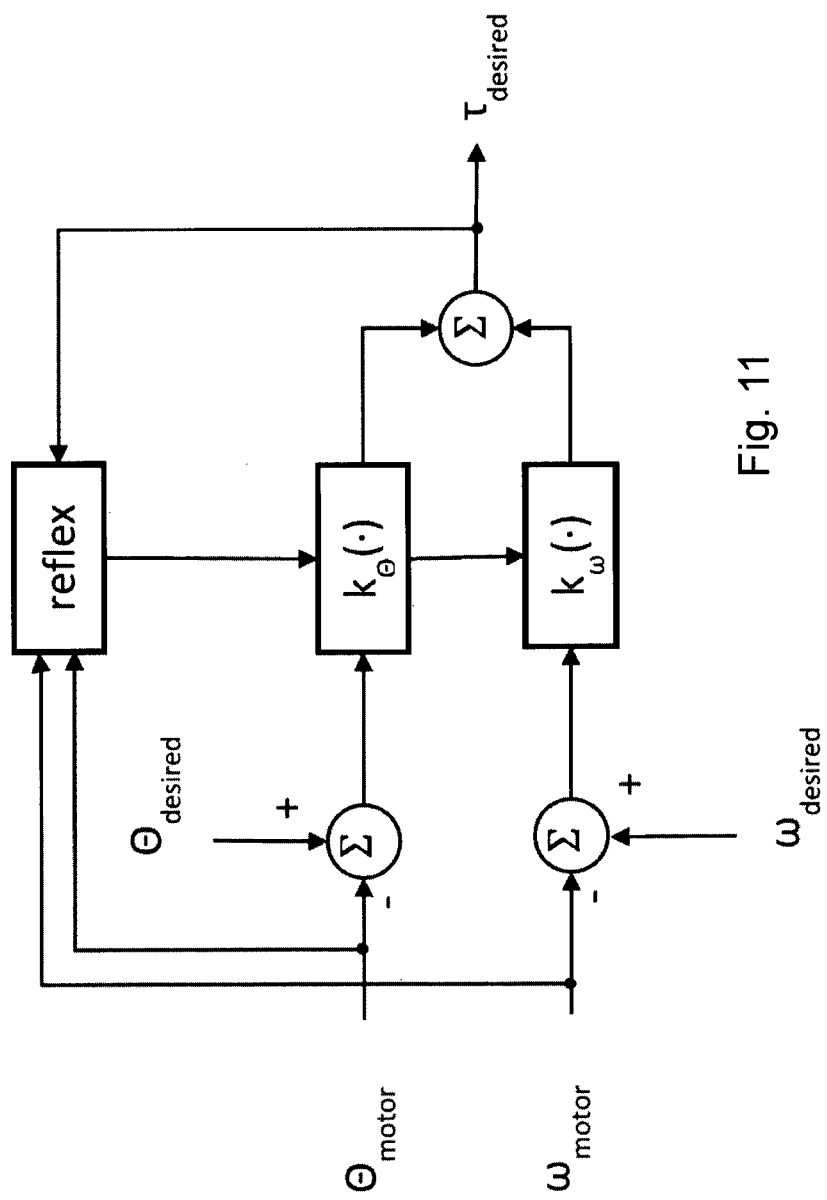
FIG. 11 is a principle scheme of the operation effecting the reflex behavior of the driving mechanism according to the invention.

Using the driving mechanism according to the invention we can get an estimate concerning the momentary extent of the output of the driving mechanism, for instance the force acting onto a robotic segment. Being aware of the extent of the force or on basis of other data (angular position, speed, acceleration, etc.), a reflex-like reactive behavior generated at the local level, i.e. on the driving mechanism implementing each robotic joint, can be realized. Such a reflex-like behavior may occur, when a given requirement is met, than the driving mechanism changes to an elastic behavior with larger or smaller spring constant, whereby it can facilitate the landing of the robotic leg or the balancing of a biped robot. When landing from low height, the knee of the robot leg realized by means of a driving mechanism can dampen the impact in a manner as described above. This reactive behavior can be realized by means of the driving mechanism in such a manner that a reflex-like low-level operation is effected thereon. When certain parameters of the robotic joint, i.e. of the driving mechanism e.g. the combination of the angular position, speed, the amount and direction of the forces acting thereon, reach a value defined by the movement of landing, a reflex-like behavior occurs facilitating the damping of the impact. If the robotic joint shows a damped elastic behavior, then the reflex-like behavior can influence the spring constant as well as the damping rate. Thus, the reflex-like behavior can be realized in such a manner, that prior to the collision the emulated elasticity is a simple spring having damped permanent spring constant. In accordance with the reflex-like behavior, at landing, the spring constant and the damping rate will be reduced. Implementation of such a reflex-like behavior is illustrated in FIG. 11. This figure represents how the reflex behavior influences a damped oscillation. A reflex module receives the momentary angular position $\Theta_{motor}$ and angular speed $\omega_{motor}$ of the stepper motor, and examines whether the event triggering the reflex behavior occurred. If it occurred, the spring constant $k_\Theta$ as well as damping $k_\omega$, will change. With the movement to be emulated an angular speed $\omega_{desired}$ desired appears as well, to which the damped system upon damping tends. If this angular speed is zero, it is referred to as normal damping, but it can take a finite value also. This behavior of the driving mechanism enables that as of the landing moment on basis of less elasticity and less damping the driving mechanism corresponding to the knee better dampens the impact force.

The primary field of application of the driving mechanism according to the invention is given by such robotic constructions, wherein the joints of the robotic construction are arranged with the driving mechanism according to the invention. The driving mechanism is preferably enclosed in unit 16 as presented in FIG. 1, and thereby can be built into such structures.

Figure 12:
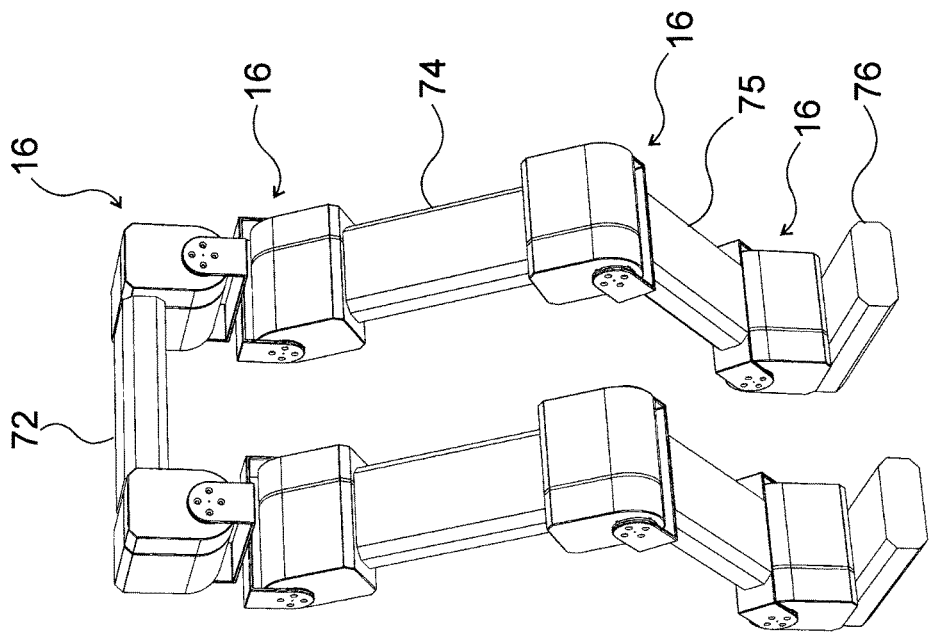
FIG. 12 is a perspective view of a robotic application of the driving mechanism according to the invention.

FIG. 12 shows a structure of two linked robotic legs made up of units 16. The units 16 are interconnected by elements 72, 74, 75, and 76 so as to form a biped robot.

Figure 13:
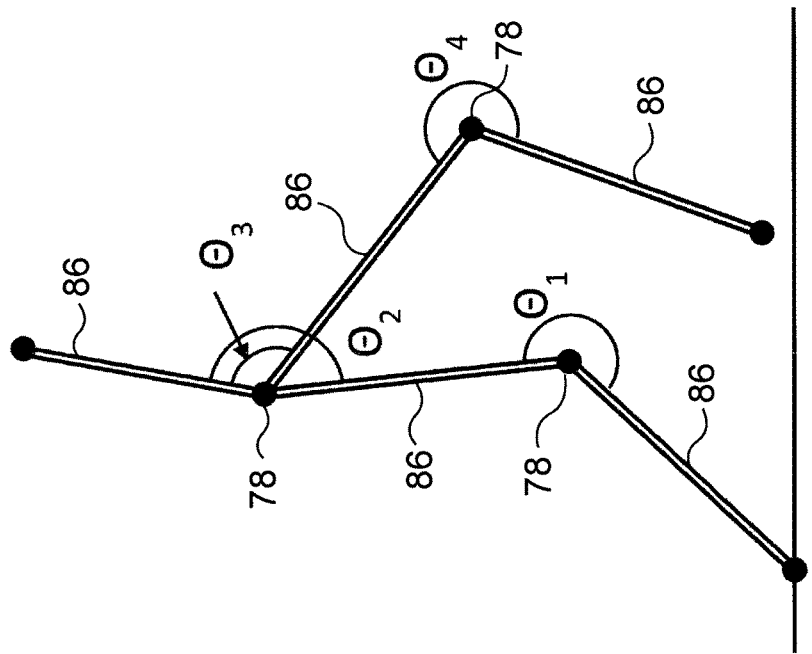
FIG. 13 is a schematic view representing a further robotic application of the driving mechanism according to the invention.

FIG. 13 shows a schematic view of a biped robot similar to the one presented in FIG. 12. The biped robot comprises units 78, similarly to unit 16 also enclosing the driving mechanism according to the present invention. The units 78 are linked by elements 86. The angles $\Theta_1$, $\Theta_2$, $\Theta_3$, $\Theta_4$ between by the adjoining elements 86 are indicated in the drawing. The angles $\Theta_1$ and $\Theta_4$ characterize the position of the knees, while angles $\Theta_2$ and $\Theta_3$ characterize the position of the thighs of the biped structure.

Figure 14:
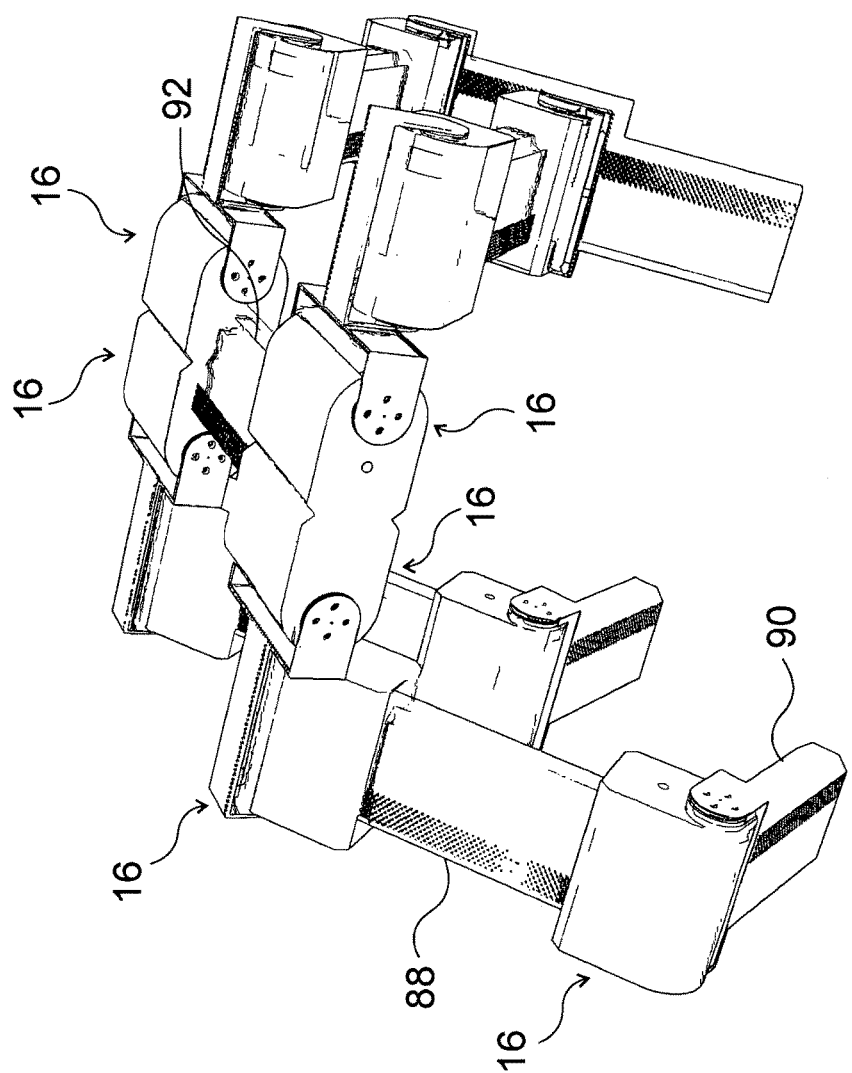
FIG. 14 is a perspective view of a yet further robotic application of the driving mechanism according to the invention.

FIG. 14 represents a quadruped construction comprising units 16 making up robotic joints as well as elements 88, 90, and 92.

FIGS. 12 and 14 illustrate how by using the driving mechanism according to the invention robotic constructions of various shapes can be constructed, for example being enclosed in unit 16.

The driving mechanism according to the invention may also contribute to the synchronization of the steps of such a biped robot. Having the two legs of the robot physically coupled, the movement of one leg would influence the position of the other and the position of the actuator therein, even in case of independent control. In the course of the movement of one leg, the consequent effect in the other leg can be measured, therefore an appropriate reflex-like pattern of movement activated therein, which will cause a synchronized walk.

The driving mechanism according to the invention can also be used in, by means of example, an arm-wrestling machine. In the machine used for practicing arm-wrestling, the counterforce exerted by the opposer is preferably emulated by a nonlinear spring. Just as the angle closed by the user arm and the vertical changes, so must the arm-wrestling machine emulate variable counterforce to simulate a force exerted by the real opposer. This can be realized by the driving mechanism according to the invention.

Figure 15B:
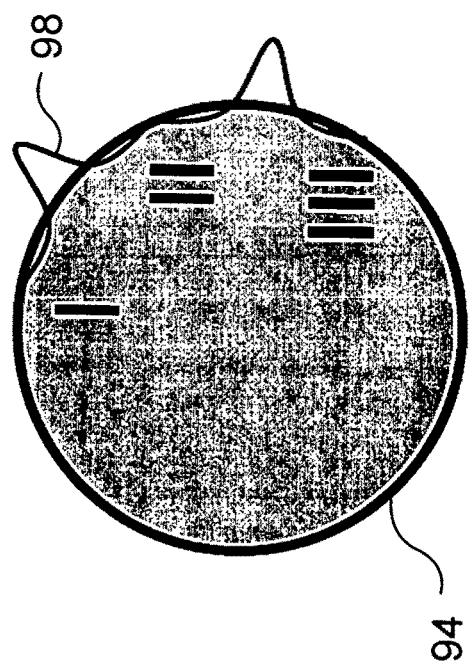
FIG. 15B is a further drawing of the application of the driving mechanism according to the invention shown in FIG. 15A.
Figure 15A:
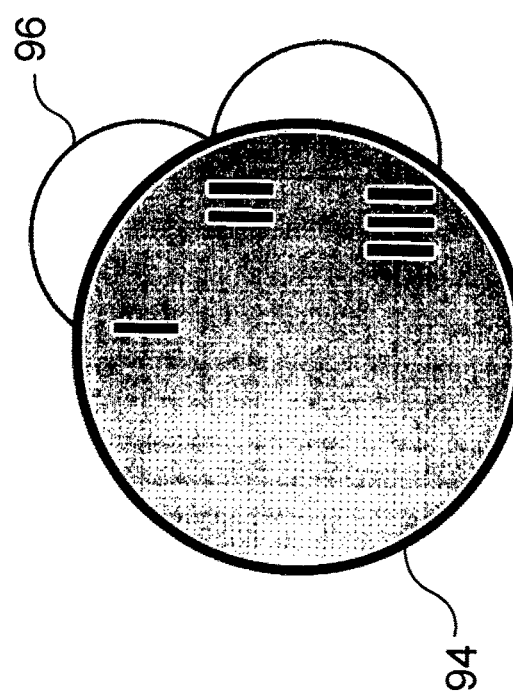
FIG. 15A is a drawing representing an application of the driving mechanism according to the invention.

Another possible field of application of the driving mechanism according to the invention is the programming of the behavior of the switch dial on household appliances, like stoves, washing machines or dish-washers. The revolution of the known switch dials are characterized by mechanically pre-set effort and force-angle. During the manufacturing process, the amount of force at which the dial of e.g. a stove can be rotated is set as well as the function of the force and path it is to have. If, for instance, a dial 94 of FIG. 15A is moved from position I to position II, then at first an increasing force is to be applied as per a characteristic graph 96, followed by a decreasing force from the mid part of the setting. By the use of the driving mechanism according to the invention, the characteristic function can be made arbitrarily adjustable; a further characteristic graph 98 is depicted in FIG. 15B.

Use of the driving mechanism according to the invention in a product of a more expensive category would enable setting the strength and characteristics of the connection based on personal preference. The driving mechanism according to the invention may possibly be used for selecting the most appropriate characteristic graph from the many in the course of the manufacture, as well.

The driving mechanism according to the invention may further be used as a visual aid in physics lessons, for instance, for the experimental presentation of spring-mass model, pendulum, inverse pendulum. Free adjustment of the spring characteristics may facilitate examination of more complex issues on a simple and inexpensive device. The driving mechanism may be used for demonstrating experiments of gravity as well, either for simulating gravity lower than real force of gravity or for simulating anti-gravity.

The most widely used actuator type amongst hobby gadgeteers, modellers and semi-professional robot constructors is the RC-servo motor. The reason behind this is that it is inexpensive and is simple to operate. It requires a power cable and a datapin, the latter serving for direct control of its position. Those using actuators, driving mechanisms for such purposes, generally are not keen on programming complex control systems, which would be unavoidable in case of industrial and other professional actuators.

Therefore, a further possible field of application of the driving mechanism according to the invention is replacing or supplementing RC-servo motors. The driving mechanism according to the invention can provide the advantageous properties, such as low investment costs and simple operation, similarly to RC-servo motors, and it is an advanced construction as well. The unit presented in FIG. 1 can be used for replacing the RC-servo motor. The size of the driving mechanism according to the present invention and therefore the unit 16 is scalable, therefore products for different purposes can be made thereof, in accordance with the required size or force.

The invention is, of course, not limited to the preferred embodiments described in details above, but further variants, modifications and developments are possible within the scope of protection determined by the claims.

The invention claimed is:

1. A driving mechanism for exerting a pre-determined torque characteristic, comprising:
   a stepper motor having a motor constant and a pole number between 25 and 100, the stepper motor comprising a first coil, a second coil, and a motor shaft,
   a rotation measuring device detecting an angular position of the motor shaft,
   a local motor control unit effecting the torque characteristic on the basis of the angular position of the motor shaft by calculating and transmitting a first control current to the first coil, and a second control current to the second coil,
   a global control unit that enables setting of parameters of a motion to be emulated,
   a drive shaft exerting the torque characteristic corresponding to the motion to be emulated, and
   an essentially backlash-free transmission connecting the drive shaft with the motor shaft and having a transmission ratio in the range of 2:1-10:1, wherein
   the local motor control unit is configured to calculate momentary values of the first control current and the second control current by:
      obtaining the angular position of the motor shaft,
      determining a feedback angle as the product of the angular position of the motor shaft and the pole number of the stepper motor,
      calculating a desired torque based on the angular position of the motor shaft and a formula of the desired torque corresponding to the motion to be emulated,
      determining a third control current as the additive inverse of the desired torque divided by the motor constant,
      determining the first control current as the product of the third control current and the sine of the feedback angle,
      determining the second control current as the additive inverse of the product of the third control current and the cosine of the feedback angle.

2. The driving mechanism according to claim 1, characterized in that the transmission is a timing belt transmission.

3. The driving mechanism according to claim 1, characterized in that the transmission is a cable transmission.

4. The driving mechanism according to claim 3, further comprising a tensioning device for tensioning the cable transmission.

5. The driving mechanism according to claim 1, characterized in that the transmission ratio falls within the range of 2:1-5:1.

6. The driving mechanism according to claim 1, characterized in that the transmission ratio falls within the range of 3:1-4:1.

7. The driving mechanism according to claim 1, characterized by the stepper motor being operable in a generator mode.

8. The driving mechanism according to claim 1, characterized in that the rotation measuring device is a magnetic rotation measuring device.

* * * * *

UNITED STATES PATENT AND TRADEMARK OFFICE
CERTIFICATE OF CORRECTION

PATENT NO. : 9,933,055 B2  
APPLICATION NO. : 14/370368  
DATED : April 3, 2018  
INVENTOR(S) : Jozsef Veres et al.

Page 1 of 1

It is certified that error appears in the above-identified patent and that said Letters Patent is hereby corrected as shown below:

On the Title Page

Item (71), Applicant Name and address "OptoForc Műszaki Fejlesztő és Innovációs KFT., Székesfehérvár (HU)," should read -- OptoForce Műszaki Fejlesztő és Innovációs KFT., Székesfehérvár (HU) --.

Item (73), Assignee Name and address "Jedik Innovation KFT., Budapest (HU)" should read -- Jedlik Innovacio KFT., Budapest (HU) --.

Signed and Sealed this  
Eleventh Day of December, 2018

Andrei Iancu  
*Director of the United States Patent and Trademark Office*